US012384177B2

(12) United States Patent
Yang

(10) Patent No.: US 12,384,177 B2
(45) Date of Patent: Aug. 12, 2025

(54) PRINTER ENABLING USERS TO QUICKLY CHANGE AND INSTALL PAPER

(71) Applicant: CHENGDING INDUSTRIAL CO., LTD., Taoyuan (TW)

(72) Inventor: Cheng-Wen Yang, Taoyuan (TW)

(73) Assignee: CHENGDING INDUSTRIAL CO., LTD., Taoyuan (TW)

( * ) Notice: Subject to any disclaimer, the term of this patent is extended or adjusted under 35 U.S.C. 154(b) by 169 days.

(21) Appl. No.: 18/358,624

(22) Filed: Jul. 25, 2023

(65) Prior Publication Data

US 2025/0033389 A1 Jan. 30, 2025

(51) Int. Cl.
*B41J 15/04* (2006.01)

(52) U.S. Cl.
CPC ........... *B41J 15/046* (2013.01); *B41J 15/042* (2013.01)

(58) Field of Classification Search
CPC .............................. B41J 15/046; B41J 15/042
See application file for complete search history.

(56) References Cited

U.S. PATENT DOCUMENTS 6,491,459 B2 * 12/2002 Hosomi ................. B41J 15/042 400/613
7,832,680 B2 * 11/2010 Yokoyama ............... B41J 15/04 242/566

* cited by examiner

*Primary Examiner* — Henok D Legesse
(74) *Attorney, Agent, or Firm* — MUNCY, GEISSLER, OLDS & LOWE, P.C.

(57) ABSTRACT

A fast-operating printer which enables users to quickly change and install paper has a main body and a printing unit. By arranging a plug assembly of the guiding module into a perforation on the side wall as the hardware design, the guiding module effectively opens in a direction away from the printing module so that a larger space between the guiding module and the printing module is formed, allowing cashiers to quickly thread the paper through it, thereby accelerating the paper installation process and reducing customer waiting time. Furthermore, the first fastening members of the printing module correspondingly fasten into the second fastening members of the guiding module, ensuring stable passage of the paper through the printing module for printing. The enlarged space enables the cashier to rapidly change and install the paper sheet for printing, thereby reducing waiting time for consumers and providing other significant advantages.

6 Claims, 11 Drawing Sheets

PRINTER ENABLING USERS TO QUICKLY CHANGE AND INSTALL PAPER

BACKGROUND

1. Technical Field

This disclosure relates to a fast-operating printer, particularly a printer that allows users to quickly change and install paper for printing.

2. Description of Related Art

In general, for various types of automated machines such as automated teller machines (ATMs), self-checkout machines or vending machines, it is necessary to install a printer inside the machine to print relevant information on paper. For example, printing transaction details or receipts on thermal paper. A portion of the printed paper is exposed outside the printer panel for users to retrieve the printed transaction lists or receipts as proof of payment or pending payment. However, the curled nature of the paper, which is rolled onto a paper roll inside the machine, makes it inconvenient to install the paper. The limited space inside the printer also hinders users from smoothly installing the curled paper, affecting the paper passage process and printing procedure. This ultimately results in prolonged printing time or poor print quality. Therefore, it is essential for developers and researchers in the field of printing devices within automated machines to continuously strive to overcome and address these challenges by innovative hardware designs that effectively increase the operational space inside the printer, enabling users to quickly change and install paper for printing, thereby reducing waiting time for others.

SUMMARY

Recognizing the shortfalls, the creator of this disclosure, supported by their extensive professional knowledge and years of practical experience, has developed an improved printer that is fast-operating. The main purpose is to provide a printer that enables users to quickly change and install paper. This is achieved by arranging a plug assembly of the guiding module built in the printing unit into a perforation on the side walls of the printer's printing unit as the hardware design, the guiding module effectively opens in a direction away from the printing module so that a larger space between the guiding module and the printing module is formed. This space allows cashiers to quickly thread curled paper through it, speeding up the paper installation process in the printer and reducing waiting time for consumers. Additionally, the design of the first fastening member of the printing module correspondingly fastens into the second fastening member of the guiding module, ensuring stable passage of the paper through the printing module for printing. The enlarged space enables the cashier to rapidly change and install the paper sheet for printing, thereby reducing waiting time for consumers and providing other significant advantages.

According to the purpose of this disclosure, a fast-operating printer is proposed, at least comprising a main body and a printing unit. The main body is arranged with two opposing side walls. The printing unit is disposed at one end of the main body. The printing unit includes a printing module and a guiding module corresponding to and fastening with the printing module. The guiding module has two end portions and each end portion is extended with a swinging arm. Each swing arm is pivotally connected to a perforation of the side wall by a plug. The guiding module swings back and forth in a direction away from or towards the printing module using the plug as a pivot.

In one embodiment of this disclosure, the printing module has two end portions, each equipped with a first fastening member and the guiding module has two end portions, each equipped with a second fastening member. The first fastening members correspondingly fasten with the second fastening members to connect the printing module and the guiding module with each other.

In one embodiment of this disclosure, the first fastening members have a recessed shape and the second fastening members have a cylindrical shape. The cylindrical second fastening members are correspondingly fastened with the recessed first fastening members.

In one embodiment of this disclosure, a paper roll is disposed at the other end of the main body relative to the printing unit, and the paper roll is further wound with a paper sheet.

In one embodiment of this disclosure, the paper roll is further disposed within a slot formed on the side wall.

In one embodiment of this disclosure, a guiding wheel is disposed between the printing unit and the paper roll, and the paper sheet wound on the paper roll is guided by the guiding wheel to move in a direction towards the printing unit.

In one embodiment of this disclosure, the other end of the printing unit that is away from the guiding wheel is further arranged with a cover plate.

In one embodiment of this disclosure, the guiding module moves away from the printing module in a direction towards the cover plate.

In one embodiment of this disclosure, the cover plate is further arranged with a door panel. The door panel is pivotally connected to the cover plate by a hinge rod and opens in the direction that is away from the printing unit.

In one embodiment of this disclosure, after the paper sheet wound on the paper roll is conveyed from the paper roll to the printing unit via the guiding wheel, then the paper sheet is transmitted through a gap between the printing module and the guiding module to the printing module for printing, and finally the paper sheet exits the main body through the door panel of the cover plate.

In summary, the fast-operating printer in this disclosure primarily by arranging a plug assembly of the guiding module built-in the printing unit into a perforation on the side wall as the hardware design, the guiding module effectively opens in a direction away from the printing module so that a larger space between the guiding module and the printing module is formed, allowing cashiers to quickly thread the curled paper through the space, thereby accelerating the paper installation process and reducing customer waiting time. Additionally, the first fastening members of the printing module correspondingly fasten into the second fastening member of the guiding module, ensuring stable passage of the paper through the printing module for printing. The enlarged space enables the cashier to rapidly change and install the paper sheet for printing, thereby reducing waiting time for consumers and providing other significant advantages.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

In order for the esteemed examiner to understand the technical features, content, advantages, and effects achieved by the present disclosure, the present disclosure will be described in detail below with reference to the accompanying drawings in the form of exemplary embodiments. It should be noted that the content of the embodiments is provided as an illustrative example and does not limit the scope of protection of the present disclosure. The present disclosure can still be implemented with other feature elements or parameters. The embodiments are presented only to exemplify the scope of the claimed disclosure. Those skilled in the art will be able to make equal modifications and variations within the spirit of the present disclosure based on the description provided in this specification. The following will describe various aspects of the present disclosure in detail with reference to the accompanying drawings. It should be noted that, according to standard industry practices, the various features are not drawn to scale. In fact, the dimensions of the components can be arbitrarily enlarged or reduced to clearly illustrate the features of the present disclosure.

Figure 1:
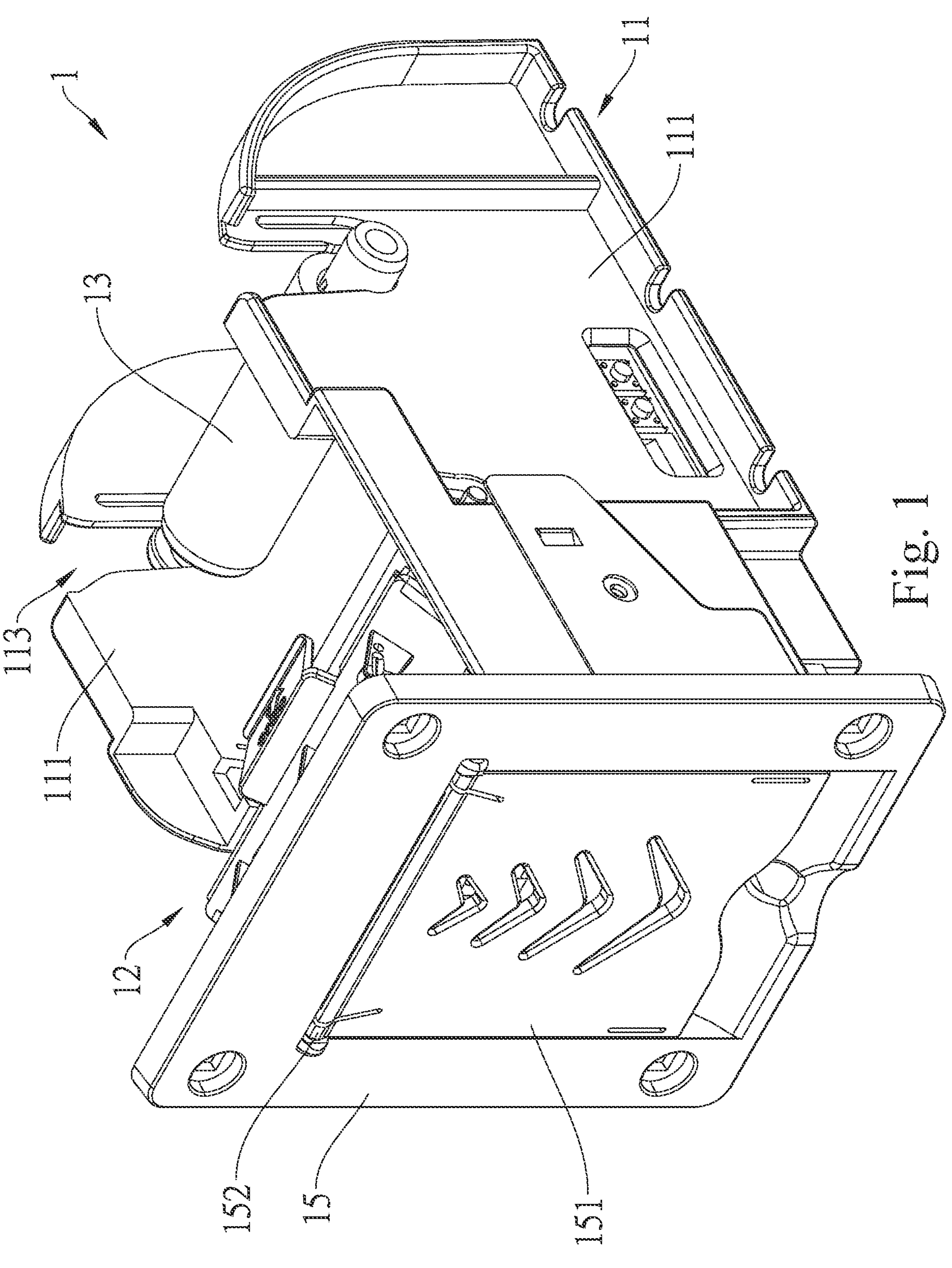
FIG. 1 is a front view of one of the preferred embodiments of the overall fast-operating printer in the present disclosure.
Figure 2:
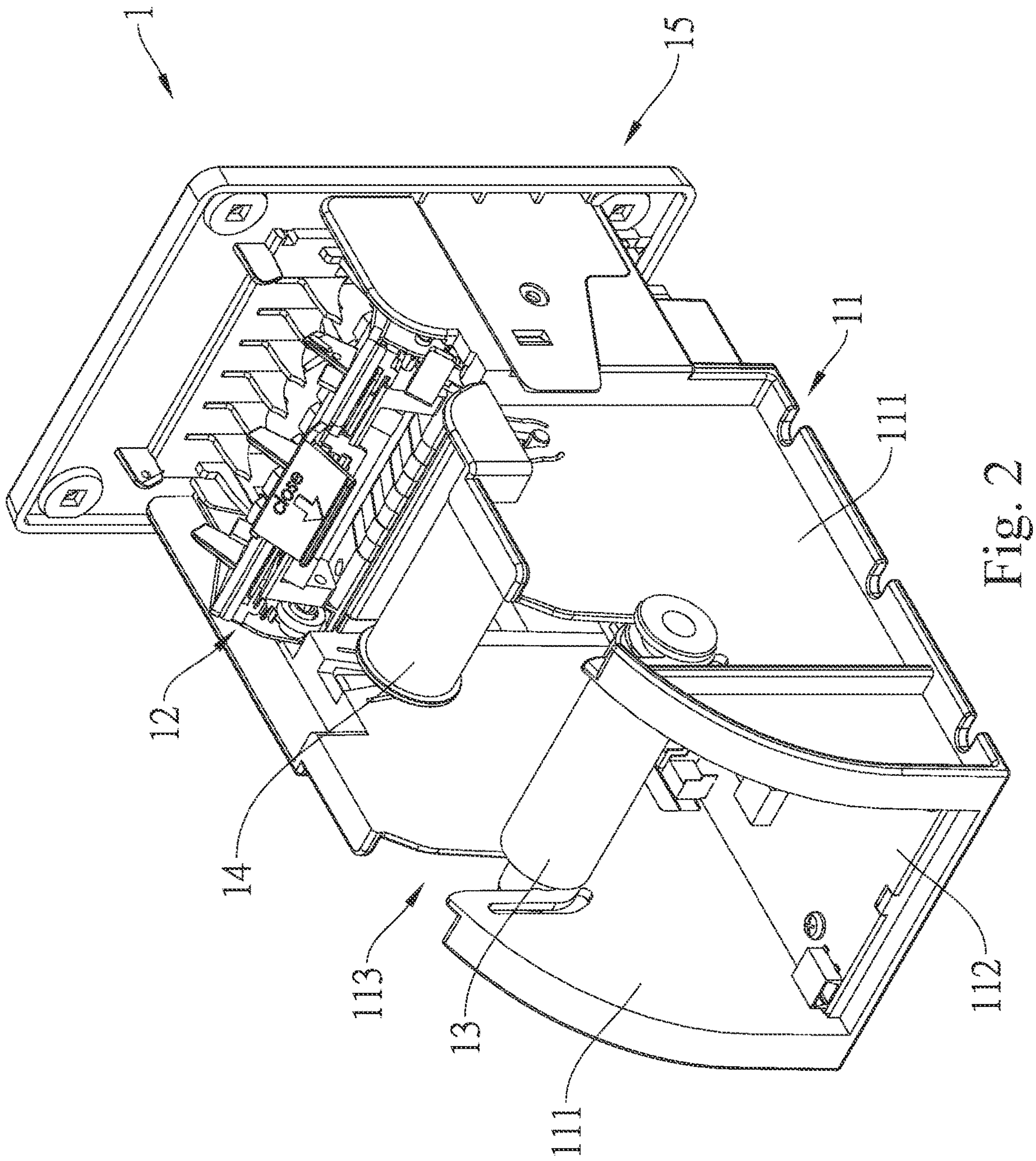
FIG. 2 is a rear view of one of the preferred embodiments of the overall fast-operating printer in the present disclosure.
Figure 3:
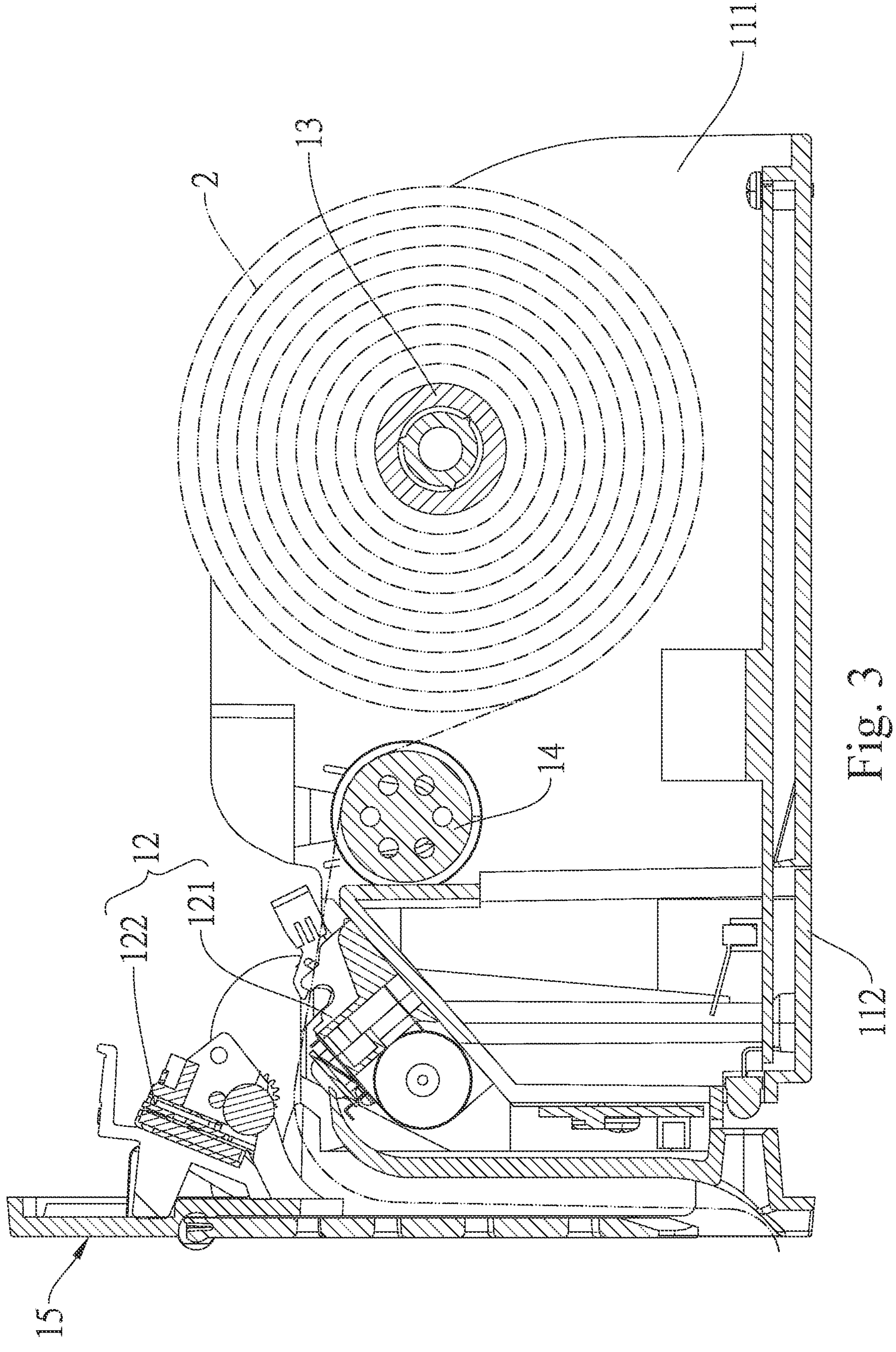
FIG. 3 is a cross-sectional view of the paper installation in one of the preferred embodiments of the fast-operating printer in the present disclosure.
Figure 4:
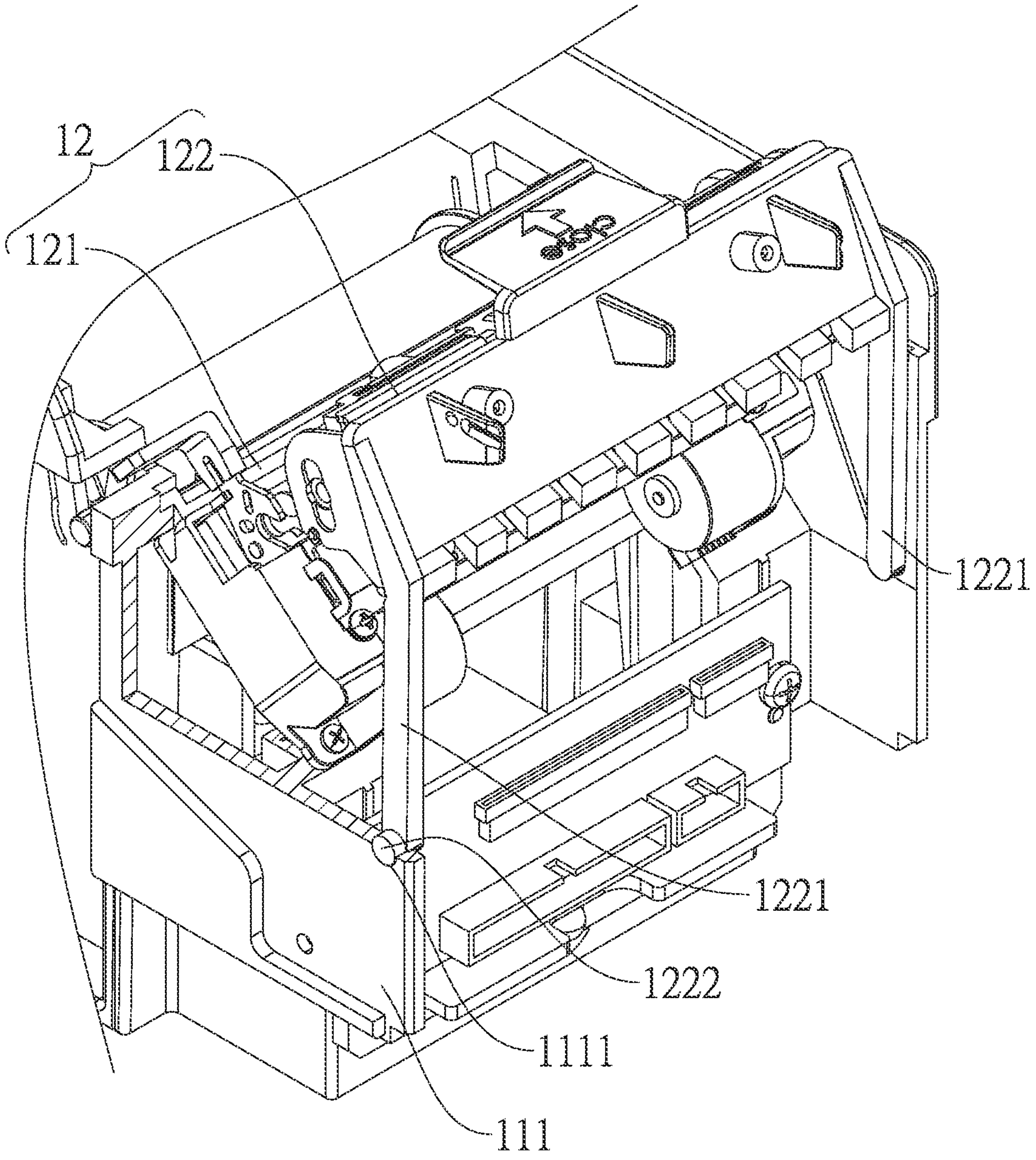
FIG. 4 is a schematic diagram of the printing unit arrangement in one of the preferred embodiments of the fast-operating printer in the present disclosure.
Figure 5:
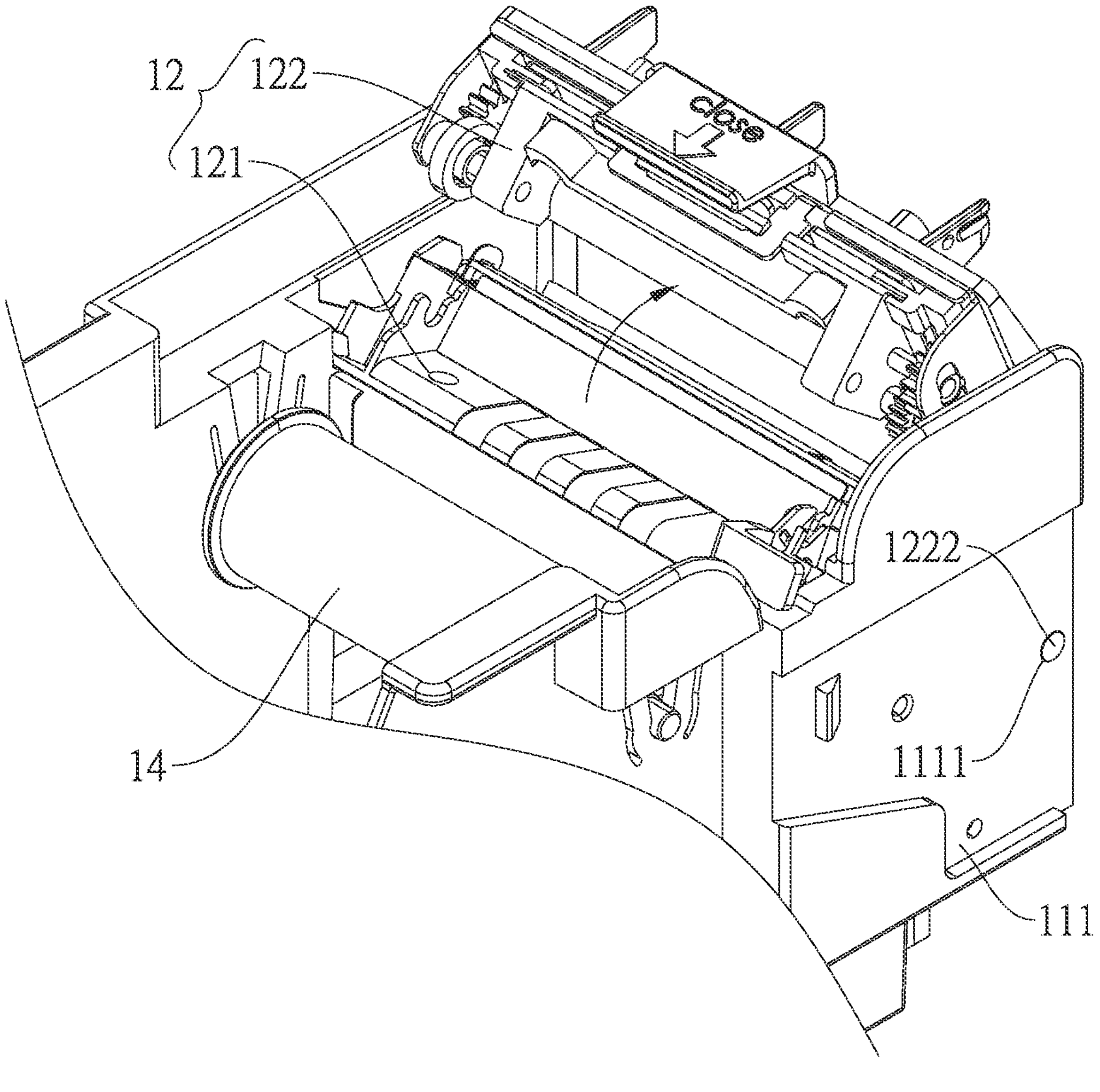
FIG. 5 is a schematic diagram of the combination of the printing module and the guiding module in one of the preferred embodiments of the fast-operating printer in the present disclosure.
Figure 6:
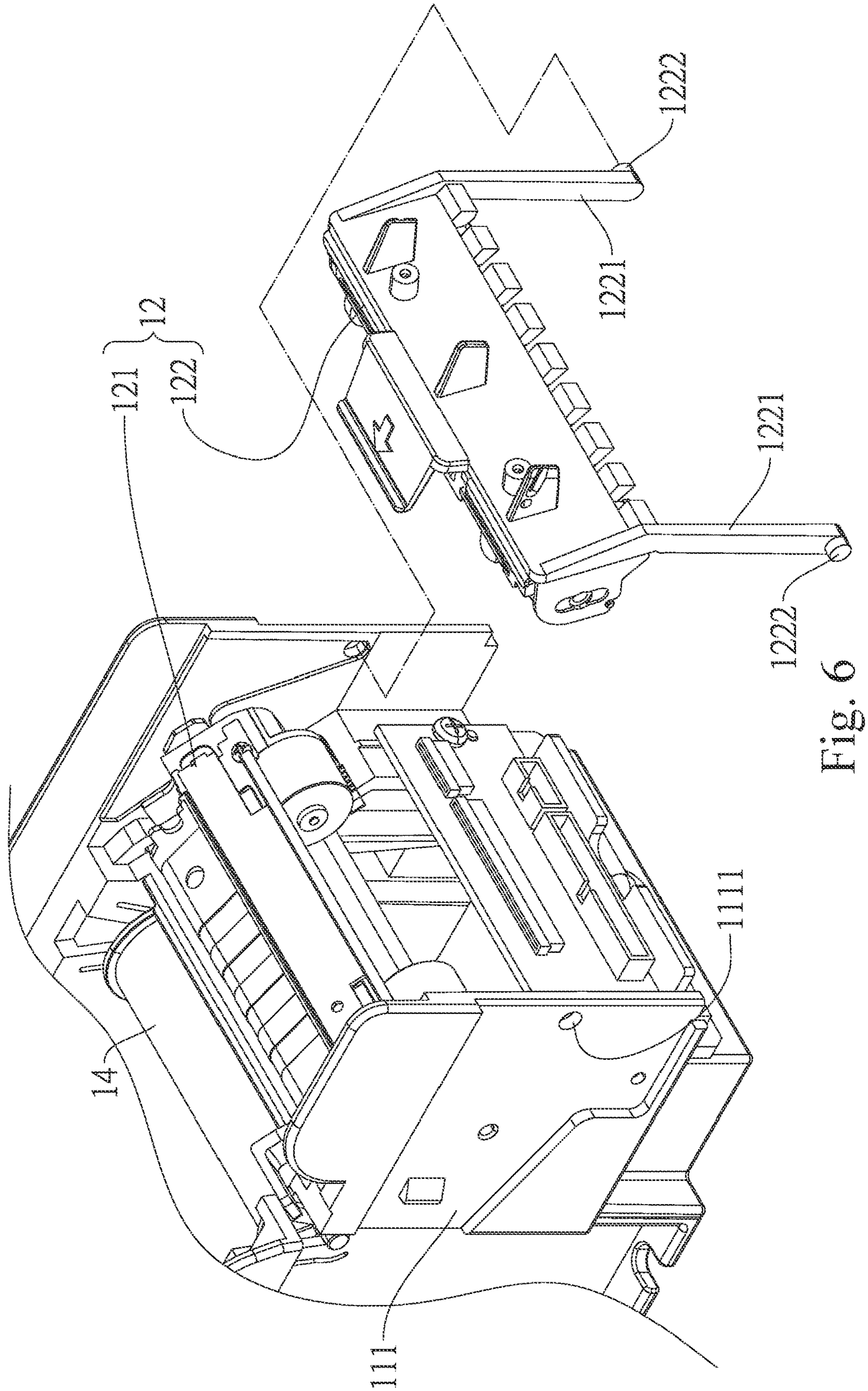
FIG. 6 is an exploded view of the printing unit in one of the preferred embodiments of the fast-operating printer in the present disclosure.

First, referring to FIGS. 1 to 3, they illustrate the front view, rear view and cross-sectional view of the paper installation of one of the preferred embodiments of the fast-operating printer in the present disclosure. The fast-operating printer (1) of the present disclosure is at least composed of a main body (11), a printing unit (12), a paper roll (13), a guiding wheel (14) and a cover plate (15). The fast-operating printer (1) is arranged within a machine (not shown in the diagrams), which may be, for example, but not limited to, an automatic teller machine, an automatic cash register or an automatic vending machine. It is used to print details, lists or receipts on a paper sheet (2), which may be, for example, but not limited to, a thermal paper. In one of the preferred embodiments of the present disclosure, the fast-operating printer (1) is installed in an automatic cash register, where a cashier can print the details or receipts of a consumer on a thermal paper sheet (2). The paper sheet (2) of the thermal paper wound on the paper roll (13) is conveyed to the printing unit (12) through the guiding wheel (14), and then transmitted to the printing module (121) for printing through the gap between the printing module (121) and the guiding module (122). Finally, the paper sheet (2) exits the main body (11) through the door panel (151) of the cover plate (15). When the thermal paper on the paper roll (13) is exhausted or jammed, the cashier must move the guiding module (122) away from the printing module (121), that is, towards the direction of the cover plate (15), to increase the gap between the printing module (121) and the guiding module (122), making it easier to install the paper sheet (2). After completion, the printing process continues. Therefore, the fast-operating printer (1) of the present disclosure primarily by arranging the plug (1222) assembly of the guiding module (122) built in the printing unit (12) into the perforation (1111) on the side wall (111) as the hardware design, effectively allows the guiding module (122) opens in a direction away from the printing module (121) so that a larger operating space between the guiding module (122) and the printing module (121) is formed. Thereby the cashier may quickly thread the slightly curled paper sheet (2) through the space. This accelerates the speed of installing the paper sheet (2) in the fast-operating printer (1) and avoids prolonged waiting time for the consumer. Furthermore, the design of the first fastening member (1211) of the printing module (121) correspondingly fasten to the second fastening member (1223) of the guiding module (122) effectively allows stable passage of the paper sheet (2) through the printing module (121) for printing. The enlarged space enables the cashier rapidly to change and install the paper sheet (2) for printing, thereby reducing waiting time for consumers and providing other significant advantages.

The main body (11) mainly includes two opposing side walls (111) arranged opposite to each other and a base (113) connected to each of the side walls (111). The base (113) is respectively perpendicular to the side walls (111). Furthermore, one end of each side wall (111) is correspondingly arranged with a slot (112) and the paper roll (13) is disposed within the slot (112). The paper sheet (2) is wound on the paper roll (13).

Figure 7:
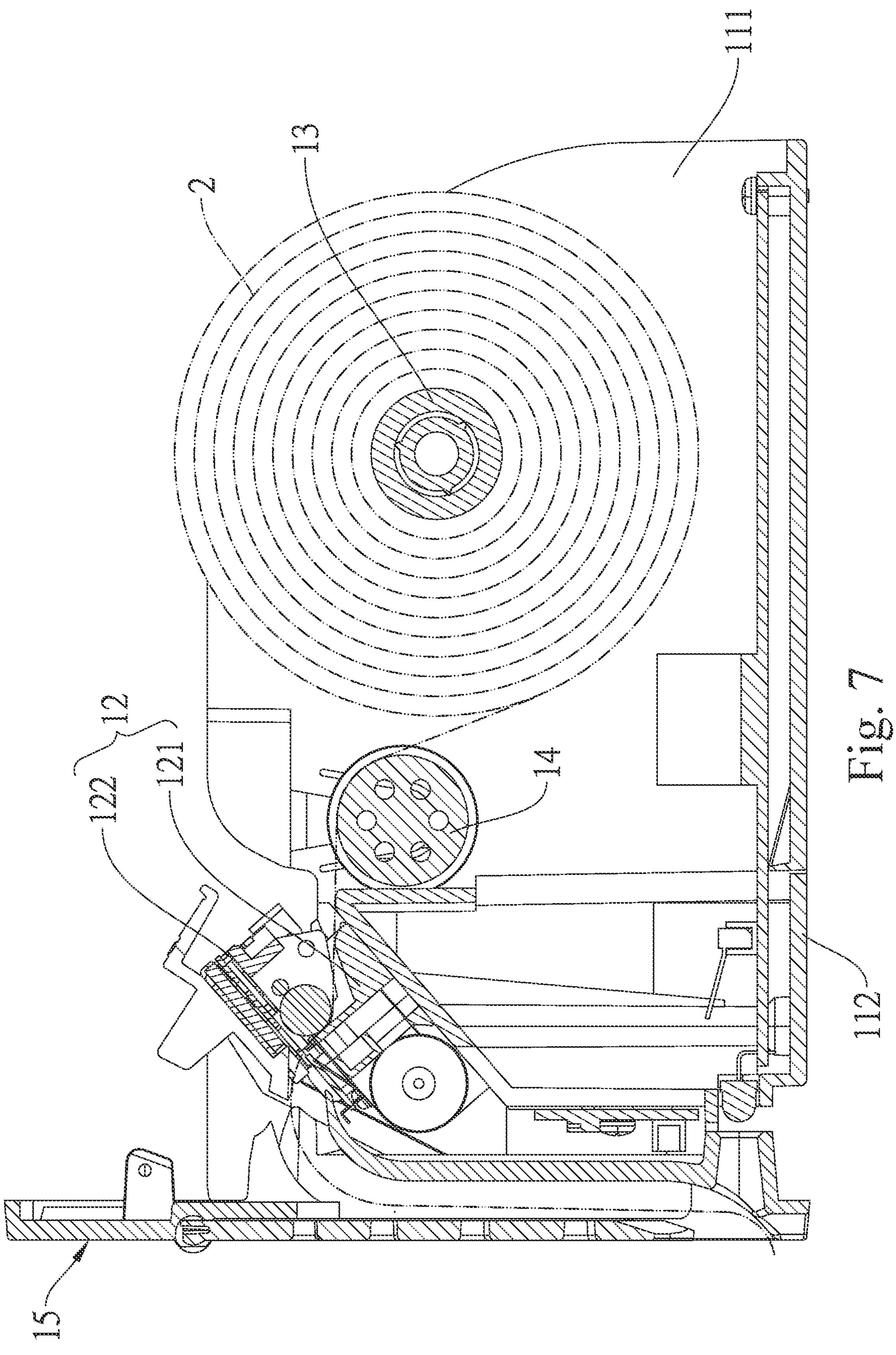
FIG. 7 is a schematic diagram of the folding of the printing unit in one of the preferred embodiments of the fast-operating printer in the present disclosure.

Referring to FIGS. 4 to 7, the schematic diagram of the printing unit arrangement, the schematic diagram of the combination of the printing module and the guiding module, the exploded view of the printing unit and the schematic diagram of the folding of the printing unit in one of the preferred embodiments of the fast-operating printer. The printing unit (12) is disposed at the other end of the main body (11) relative to the paper roll (13). The printing unit (12) is at least composed of a printing module (121) and a guiding module (122). The printing module (121) and the guiding module (122) are correspondingly fastened with each other. In addition, the two ends of the guiding module (122) are extended with swing arms (1221) in the direction towards the base (113). Each swinging arm (1221) is pivotally connected to a perforation (1111) of the side wall (111)

by a plug (1222). The guiding module (122) swings back and forth in a direction away from or towards the printing module (121) using the plug (1222) as the pivot. When the guiding module (122) is opened in the direction that is away from the printing module (121) or towards the direction of the cover plate (15) (as indicated by the arrows in FIG. 4 or FIG. 5), a larger space is formed between the guiding module (122) and the printing module (121), thereby providing space for the cashier to thread and install the paper sheet (2). After the paper sheet (2) is installed, the guiding module (122) may be folded back towards the printing module (121) or away from the cover plate (15) using the plug (1222) as the pivot (as indicated in FIG. 7) to complete the installation of the paper sheet (2). FIG. 3 shows the schematic diagram of separating the printing module (121) and the guiding module (122), while FIG. 7 shows a schematic diagram of folding the printing module (121) and the guiding module (122). By comparing the two figures, it is clear that when the guiding module (122) moves away from the printing module (121), a larger space is formed between the printing module (121) and the guiding module (122), thereby providing space for the cashier to thread and install the paper sheet (2).

Figure 8:
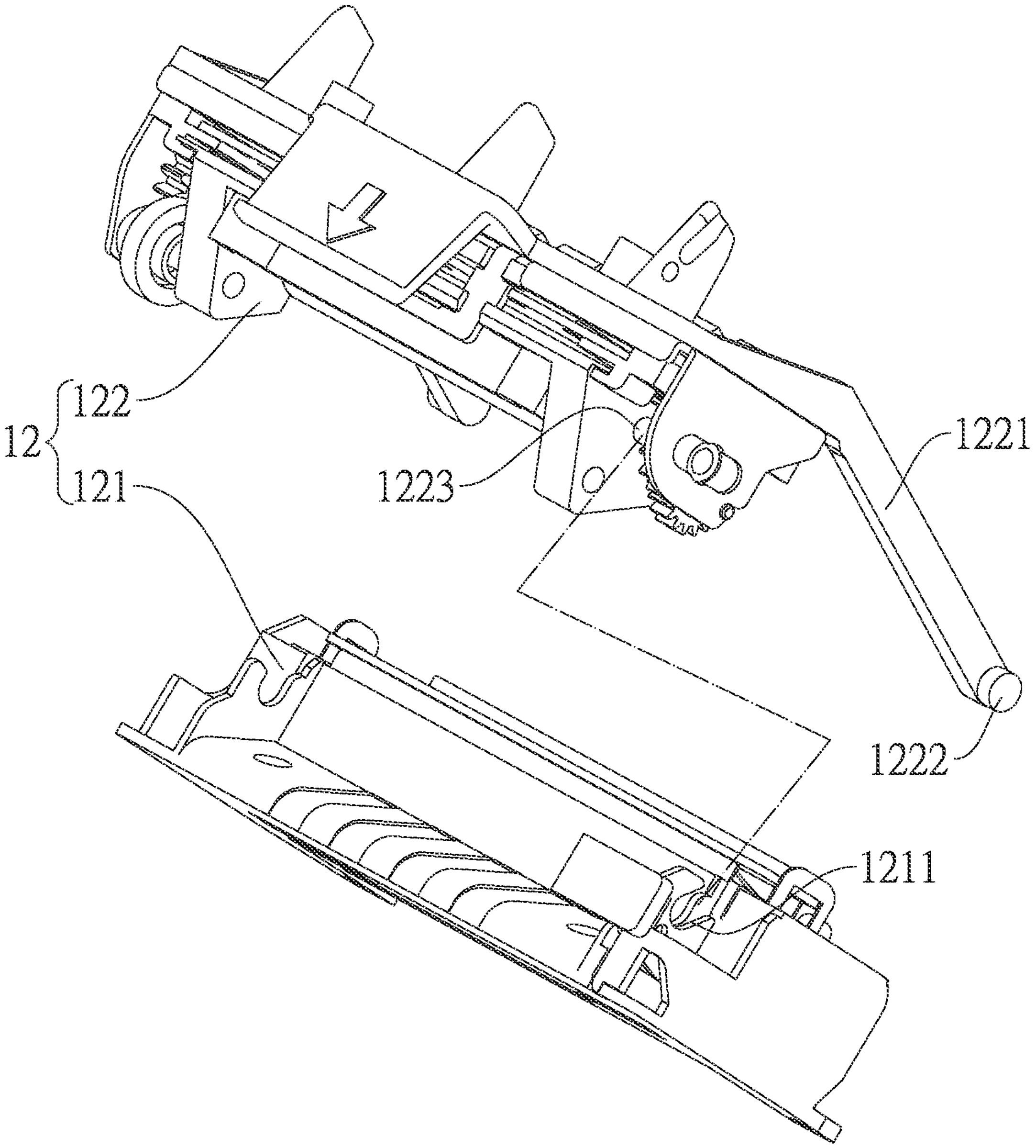
FIG. 8 is an exploded view of the printing module and the guiding module in one of the preferred embodiments of the fast-operating printer in the present disclosure.
Figure 9:
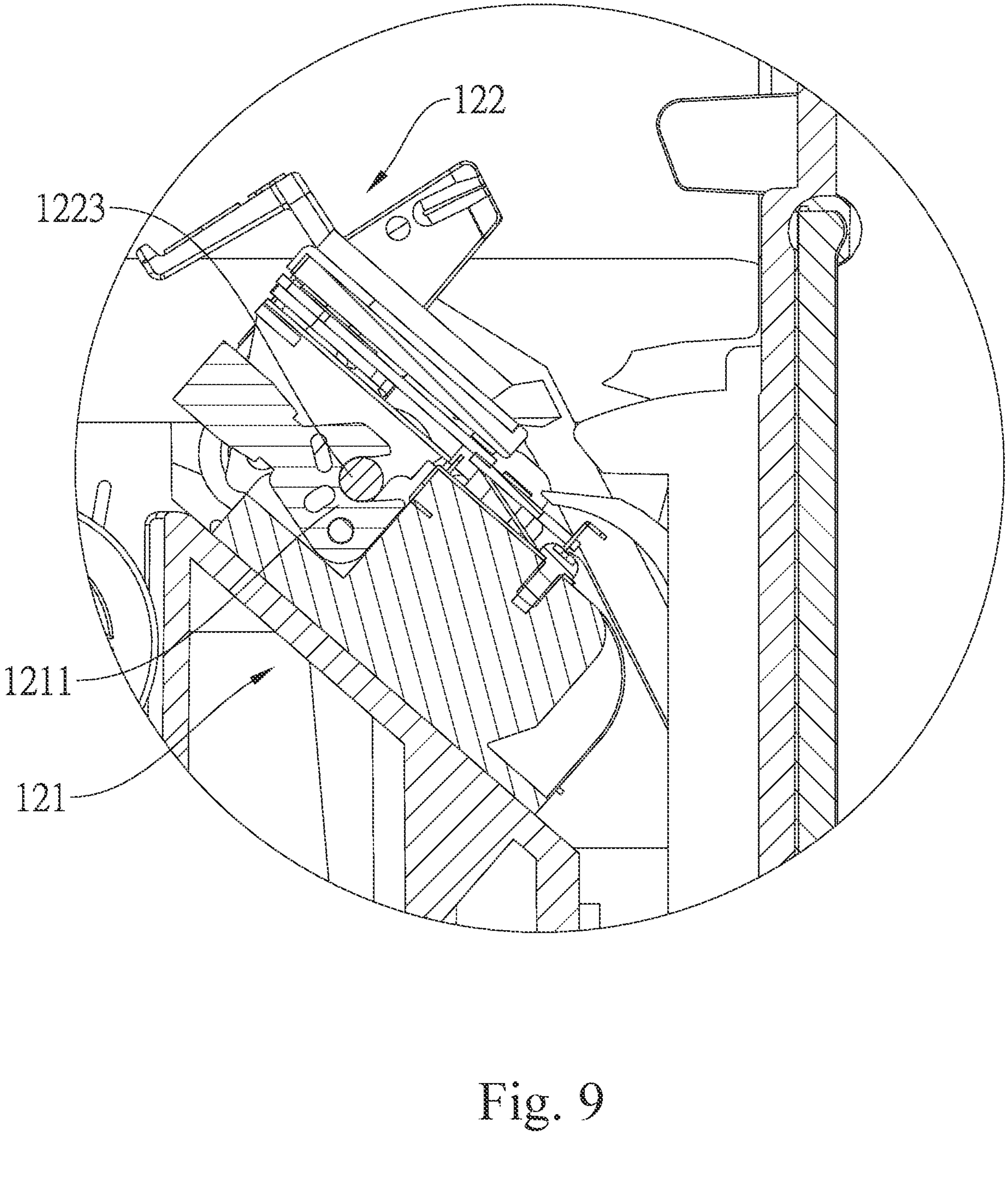
FIG. 9 is an enlarged schematic diagram of the first fastening member fasten with the second fastening member in one of the preferred embodiments of the fast-operating printer in the present disclosure.
Figure 10:
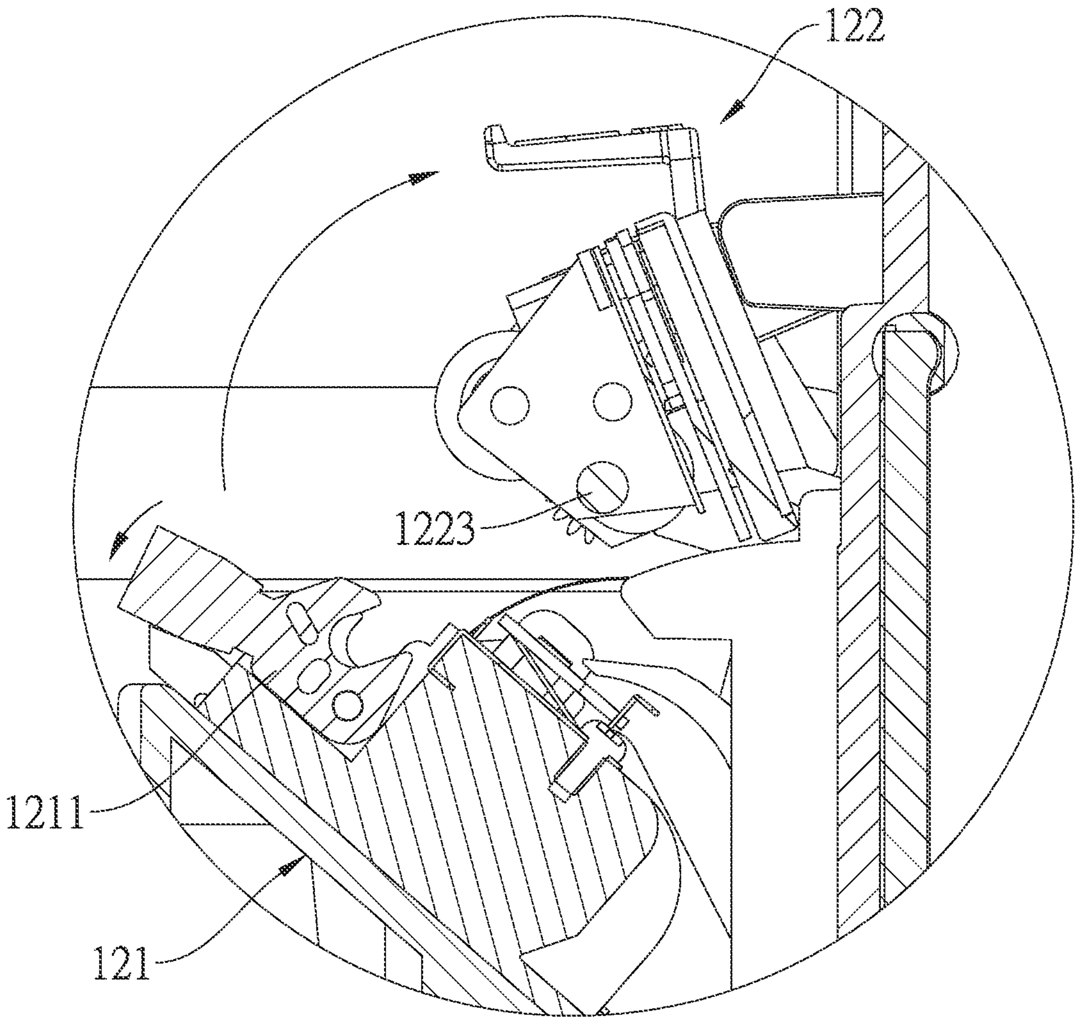
FIG. 10 is an enlarged schematic diagram of the first fastening member separated from the second fastening member in one of the preferred embodiments of the fast-operating printer in the present disclosure.

Additionally, referring to FIGS. 8 to 10, the exploded view of the printing module and the guiding module, the enlarged schematic diagram of the first fastening member fasten with the second fastening member and the enlarged schematic diagram of the first fastening member separated from the second fastening member in one of the preferred embodiments of the fast-operating printer in the present disclosure are shown. The printing module (121) has two end portions each arranged with a first fastening member (1211) with a recess and the guiding module (122) has two end portions each arranged with a cylindrical second fastening member (1223), and the first fastening members (1211) correspondingly fasten with the second fastening members (1223) to connect the printing module (121) and the guiding module (122) with each other. In other words, after the cylindrical second fastening member (1223) is inserted into the recess of the first fastening member (1211), the printing module (121) connects to the guiding module (122) and the fast-operating printer (1) may perform printing operations on the paper sheet (2) disposed between the printing module (121) and the guiding module (122).

The guiding wheel (14) is disposed between the printing module (12) and the paper roll (13). The guiding wheel (14) is for transferring the paper sheet (2) wound on the paper roll (13) to the printing module (12) for printing operations.

Figure 11:
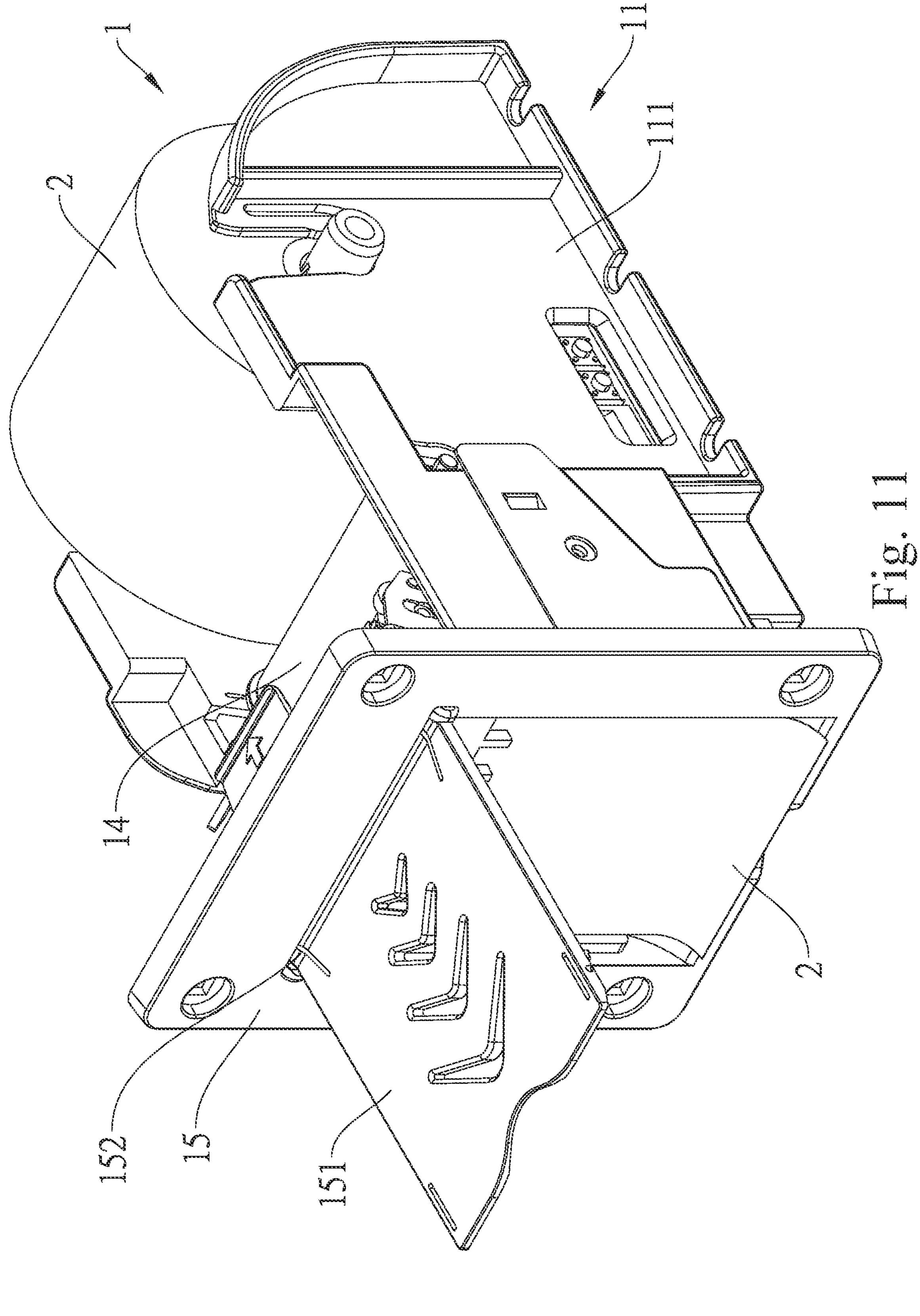
FIG. 11 is a schematic diagram of the door panel in an open state in one of the preferred embodiments of the fast-operating printer in the present disclosure.

Referring to FIG. 11, the schematic diagram of the door panel in an open state in one of the preferred embodiments of the fast-operating printer in the present disclosure is shown. At the other end of the printing unit (12) that is away from the guiding wheel (14) is further arranged with a cover plate (15). The middle of the cover plate (15) has a door panel (151) that is pivotally connected to the cover plate (15) by a hinge rod (152). The door panel (151) may be opened in the direction away from the printing module (12) by the hinge rod (152) thereby forming an opening. This allows the printed paper sheets (2) from the printing unit (12) to exit the fast-operating printer (1) through the opening formed by the door panel (151). Then the cashier may tear off the required paper sheets (2) from the door panel (151) and deliver them to the customers for record-keeping.

Based on the above embodiments, the present disclosure has the following advantages compared to the prior art and existing products:

The fast-operating printer of the present disclosure primarily by arranging a plug assembly of the guiding module built-in the printing unit into a perforation on the side wall as the hardware design, the guiding module effectively opens in a direction away from the printing module so that a larger space between the guiding module and the printing module is formed, allowing cashiers to quickly thread the curled paper through the space, thereby accelerating the paper installation process and reducing customer waiting time. Additionally, the first fastening members of the printing module correspondingly fasten into the second fastening member of the guiding module, ensuring stable passage of the paper through the printing module for printing. Thus, advantages such as effectively increasing the space that enabling cashiers to rapidly change and install paper, and thereby reducing customer waiting time may be achieved.

In summary, the fast-operating printer of the present disclosure does achieve the expected operational effectiveness through the disclosed embodiments. The disclosure has not been previously disclosed and it fully complies with the requirements of the patent law. Therefore, a patent application is submitted in accordance with the law and it is requested to be examined and granted. Your favorable consideration is sincerely appreciated.

However, the above-described illustrations and explanations are merely preferred embodiments of the present disclosure and should not be considered as limiting the scope of protection. Those skilled in the art will recognize that other equivalent variations or modifications within the scope of the present disclosure should be deemed to be within the design of the present disclosure.

What is claimed is:

1. A fast-operating printer, at least comprising:

a main body, arranged with two opposing side walls; and a printing unit, disposed at one end of the main body, the printing unit comprising:

a printing module; and a guiding module, corresponding to and fastening with the printing module, the guiding module having two end portions and each end portion being extended with a swinging arm, each swinging arm being pivotally connected to a perforation of the side wall by a plug, wherein the guiding module swinging back and forth in a direction away from or towards the printing module using the plug as a pivot;

a paper roll disposed at the other end of the main body relative to the printing unit, and the paper roll is further wound with a paper sheet;

a guiding wheel disposed between the printing unit and the paper roll, and the paper sheet wound on the paper roll is guided by the guiding wheel to move in a direction towards the printing unit;

wherein other end of the printing unit which is away from the guiding wheel is further arranged with a cover plate;

wherein the cover plate is further arranged with a door panel, the door panel is pivotally connected to the cover plate by a hinge rod and opens in the direction that is away from the printing unit.

2. The fast-operating printer according to claim 1, wherein the printing module has two end portions each equipped with a first fastening member and the guiding module has two end portions each equipped with a second fastening member, and the first fastening members correspondingly fasten with the second fastening members to connect the printing module and the guiding module with each other.

3. The fast-operating printer according to claim 2, wherein the first fastening members have a recessed shape and the second fastening members have a cylindrical shape, and the cylindrical second fastening members are fastened with the recessed first fastening members.

4. The fast-operating printer according to claim 1, wherein the paper roll is further disposed within a slot formed on the side wall.

5. The fast-operating printer according to claim 1, wherein the guiding module moves away from the printing module in a direction towards the cover plate.

6. The fast-operating printer according to claim 1, wherein the paper sheet wound on the paper roll is conveyed from the paper roll to the printing unit via the guiding wheel, then the paper sheet is transmitted through a gap between the printing module and the guiding module to the printing module for printing, and finally the paper sheet exits the main body through the door panel of the cover plate.

* * * * *